(12) United States Patent
Kim et al.

(10) Patent No.: US 10,237,895 B2
(45) Date of Patent: *Mar. 19, 2019

(54) METHOD AND APPARATUS FOR INITIATING COMMUNICATIONS ON A SHARED CHANNEL IN A MOBILE COMMUNICATION SYSTEM

(71) Applicant: Samsung Electronics Co., Ltd., Suwon-si, Gyeonggi-do (KR)

(72) Inventors: Soeng-Hun Kim Kim, Suwon-si (KR); Gert Jan Van Lieshout, Apeldoorn (NL); Sung-Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

This patent is subject to a terminal disclaimer.

(21) Appl. No.: 14/866,170

(22) Filed: Sep. 25, 2015

(65) Prior Publication Data

US 2016/0044714 A1 Feb. 11, 2016

Related U.S. Application Data

(63) Continuation of application No. 14/176,738, filed on Feb. 10, 2014, now Pat. No. 9,288,825, which is a (Continued)

(30) Foreign Application Priority Data

Nov. 24, 2005 (KR) ........................ 10-2005-0113193

(51) Int. Cl.
*H04W 74/08* (2009.01)
*H04W 74/00* (2009.01)
*H04W 88/02* (2009.01)

(52) U.S. Cl.
CPC ..... *H04W 74/0833* (2013.01); *H04W 74/002* (2013.01); *H04W 74/0866* (2013.01); *H04W 88/02* (2013.01)

(58) Field of Classification Search
None
See application file for complete search history.

(56) References Cited

U.S. PATENT DOCUMENTS 6,252,868 B1   6/2001 Diachina et al.
6,331,971 B1  12/2001 Raith
(Continued)

FOREIGN PATENT DOCUMENTS

CN    1620185 A    5/2005
EP     993215 A1  12/2000
(Continued)

OTHER PUBLICATIONS

Holma, Harri; Toskala, Antti. "WCDMA for UMTS" Jun. 1, 2006; pp. 76/78, 106-107, 111-112. 2002.
(Continued)

*Primary Examiner* — Kashif Siddiqui
*Assistant Examiner* — Mehedi S Aley
(74) *Attorney, Agent, or Firm* — Jefferson IP Law, LLP

(57) ABSTRACT

A method and apparatus for initiating communications on a shared channel in a mobile communication system are provided. A user equipment transmits an uplink signal for requesting communications on the shared channel to a Node B, and waits for a delay duration without monitoring a downlink after transmitting the uplink signal. When the delay duration has elapsed, the user equipment monitors the downlink during a valid period and determines whether a downlink signal responding to the uplink signal is received in a transmission time interval within the valid period. When the downlink signal is received in the valid period, the user (Continued)

equipment transmits and receives data on the shared channel.

12 Claims, 13 Drawing Sheets

Related U.S. Application Data continuation of application No. 11/603,237, filed on Nov. 22, 2006, now Pat. No. 8,670,392.

(56) References Cited

U.S. PATENT DOCUMENTS

| | | | |
|---|---|---|---|
| 6,560,439 B1 | 5/2003 | Grayson | |
| 6,898,429 B1* | 5/2005 | Vialen | H04W 68/00 455/432.1 |
| 2004/0008657 A1 | 1/2004 | Lee et al. | |
| 2004/0087319 A1 | 5/2004 | Bos et al. | |
| 2004/0116139 A1 | 6/2004 | Yi et al. | |
| 2004/0146028 A1 | 7/2004 | Hsu et al. | |
| 2004/0146067 A1 | 7/2004 | Yi et al. | |
| 2004/0152476 A1 | 8/2004 | Kuwano et al. | |
| 2004/0185837 A1* | 9/2004 | Kim | H04H 60/91 455/414.3 |
| 2005/0058058 A1* | 3/2005 | Cho | H04W 74/002 370/208 |
| 2005/0075108 A1 | 4/2005 | Cho et al. | |
| 2005/0083913 A1 | 4/2005 | Choi et al. | |
| 2006/0107287 A1 | 5/2006 | Lee et al. | |
| 2006/0109812 A1 | 5/2006 | Kim et al. | |
| 2007/0097866 A1 | 5/2007 | Kahtava et al. | |
| 2008/0151828 A1* | 6/2008 | Bjorken | H04W 72/044 370/329 |
| 2008/0285670 A1 | 11/2008 | Walton et al. | |
| 2009/0323646 A1 | 12/2009 | Ketchum et al. | |

FOREIGN PATENT DOCUMENTS

| | | |
|---|---|---|
| JP | 01189237 A | 7/1898 |
| JP | 2003529275 A | 9/2003 |
| JP | 2005039631 A | 2/2005 |
| RU | 2232472 C2 | 7/2001 |
| RU | 2003131393 A | 4/2005 |
| WO | 9834430 A1 | 8/1998 |
| WO | 9960729 A1 | 11/1999 |
| WO | 0173970 A2 | 10/2001 |
| WO | 0239623 A1 | 5/2002 |
| WO | 02080401 A2 | 10/2002 |

OTHER PUBLICATIONS

3GPP: "3GPP TR 25.814 v0.4.2, 3rd Generation Partnership Project; Technical Specification Group Radio Access Network; Physical Layer Aspects for Evolved UTRA" (Release 7); Nov. 23, 2005; pp. 1-72. XP-002421103.

Holma, Harri; Toskala, Antti.; Lappalainen, Ukko; "WCDMA for UMTS: Introduction—WCDMA in Third Generation Systems"; 2002 John Wiley & Sons, Ltd. 2 pages.

Chinese Office Action dated Jun. 28, 2018, issued in Chinese Application No. 201510174128.4.

* cited by examiner

METHOD AND APPARATUS FOR INITIATING COMMUNICATIONS ON A SHARED CHANNEL IN A MOBILE COMMUNICATION SYSTEM

CROSS-REFERENCE TO RELATED APPLICATION

This is a continuation application of prior U.S. patent application Ser. No. 14/176,738, filed Feb. 10, 2014, which is a continuation of U.S. patent application Ser. No. 11/603,237, filed on Nov. 22, 2006, which issued as U.S. Pat. No. 8,670,392 on Mar. 11, 2014; and claims the benefit under 35 U.S.C. § 119(a) of Korean Patent Application filed in the Korean Intellectual Property Office on Nov. 24, 2005 and assigned Serial No. 10-2005-0113193, the entire disclosure of which is hereby incorporated by reference.

BACKGROUND OF THE INVENTION

Field of the Invention

The present invention generally relates to a mobile communication system. More particularly, the present invention relates to a method and apparatus for initiating communications on a shared channel.

Description of the Related Art

A Universal Mobile Telecommunication Service (UMTS) system is a third-generation asynchronous mobile communication system using Wideband Code Division Multiple Access (WCDMA) based on General Packet Radio Services (GPRS) and a Global System for Mobile Communications (GSM) serving as a European mobile communication system.

In the Third-Generation Partnership Project (3GPP) responsible for UMTS standardization, Long Term Evolution (LTE) of the UMTS system is under discussion. The LTE is targeted for commercialization around 2010 and is a technology for implementing high-speed packet based communication at about 100 Mbps. For this, many methods are being considered. For example, there are methods for reducing the number of nodes on a communication path by simplifying a network structure, for enabling wireless protocols in close proximity to a radio channel, and the like. It is predicted that an LTE structure will be changed from a 4-node structure of the legacy UMTS system to a 2- or 3-node structure.

FIG. 1 illustrates an example of a structure of an evolved UMTS mobile communication system. As illustrated in FIG. 1, Evolved Radio Access Networks (E-RANs) 110 and 112 are simplified into 2-node structures of Evolved Node Bs (ENBs) 120, 122, 124, 126, and 128 and Evolved Gateway GPRS Serving Nodes (EGGSNs) 130 and 132. A User Equipment (UE) 101 connects to an Internet Protocol (IP) network 114 over the E-RANs 110 and 112.

The ENBs 120 to 128 are based on legacy Node Bs of the UMTS system and connect to the UE 101 through a radio channel. In comparison with the legacy Node Bs, the ENBs 120 to 128 perform more complex functions. Because all user traffics as well as a real-time service of Voice over IP (VoIP) are transmitted on a Shared Channel (SCH) in the LTE system, a device is required which can collect information of UEs and perform a scheduling process. The ENBs 120 to 128 are responsible for the scheduling process.

The term "evolved" is used to distinguish the 3GPP LTE system from the legacy UMTS system. To avoid the confusion in the following description, the terms "UE", "Node B" and "network" are simply used.

The LTE system performs a Hybrid Automatic Retransmission Request (HARQ) between a Node B and a UE as in High Speed Downlink Packet Access (HSDPA) and Enhanced uplink Dedicated Channel (E-DCH). The HARQ is a scheme for increasing a probability of successful reception by soft combining previously received data with retransmitted data without discarding previously received data. However, because various Quality of Service (QoS) requirements cannot be satisfied only by the HARQ scheme, an outer ARQ can be performed in a higher layer. The outer ARQ is also performed between a Node B and a UE.

To implement a transmission rate of a maximum of 100 Mbps, the LTE system can employ a wireless access technology of Orthogonal Frequency Division Multiplexing (OFDM) at a bandwidth of 20 MHz. The UE can apply an Adaptive Modulation & Coding (AMC) scheme for setting a modulation scheme and a channel coding rate proper for a channel state.

In the LTE system constructed as described above, every data is transmitted and received on an SCH. A process for transmitting and receiving data on the SCH will be described with reference to FIG. 2. In FIG. 2, a receiver 205 and a transmitter 210 include a UE and a Node B in downlink, respectively, or a Node B and a UE in uplink, respectively. In the case of downlink communication as described below, the receiver 205 is the UE and the transmitter 210 is the Node B.

Before a packet is transmitted on the SCH in FIG. 2, the Node B 210 first transmits per packet control information on a Shared Control Channel (SCCH) in step 215. The per packet control information corresponds to a short Identifier (ID) of the UE 205 for receiving a packet, a packet size, a radio channel on which the packet is transmitted, a modulation scheme, channel coding, a HARQ, and the like. When receiving the per packet control information, the UE 205 determines whether its own short ID is equal to that included in the per packet control information and determines whether to receive a subsequent packet.

When the two short IDs are the same, the UE 205 receives a user data packet on the SCH, decodes the packet on the basis of the per packet control information, and performs an error check in step 220. The UE 205 transmits an Acknowledge (ACK) or Non-acknowledge (NACK) message to the Node B 210 on the basis of an error check result in step 225.

It is preferred that a size of the short ID of the UE is minimized because the short ID of the UE is information to be continuously transmitted on the SCCH (upon transmission of every packet). The short ID of the UE has a unique value within a cell. The Node B is responsible for allocating and de-allocating short IDs for UEs within a cell. Thus, when the UE is powered on or moves to a new cell, the UE desiring to transmit and receive data on the SCH should receive a new short ID allocated from a Node B of a current cell or the new cell.

A message for allocating the short ID cannot be transmitted on the SCH and therefore uses a new type of channel rather than the SCH in downlink. Next, an operation for receiving a newly allocated short ID will be described when the UE is powered on or moves to a new cell.

FIG. 3 is a message flow diagram illustrating a conventional operation for acquiring a short ID after a UE moves to a new cell.

Referring to FIG. 3, a UE 305 acquires system information from a Node B 310 of a current cell or a new cell when it is powered on or moves to the new cell in step 315. The system information is common information to be provided up to a cell boundary through known cell-by-cell channels, and includes information to be detected by the UE 305 for initiating communications in the cell. For example, the system information is random access information, neighbor cell information, and the like.

In step 320, the UE 305 transmits an Initial Uplink Message (IUM) on a Random Access Channel (RACH) using the acquired system information. In general, the IUM is used to notify a network of the presence of the UE 305, and contains a unique ID, capability information, and the like. When receiving the IUM, the Node B 310 sets a short ID to be allocated to the UE 305. In step 325, the short ID is contained in an Initial Downlink Message (IDM) and is transmitted to the UE 305. Before data is transmitted, the IDM is first transmitted from the Node B 310 to the UE 305. In addition, information required to use the SCH in the UE 305 is basically contained in the IDM. For example, the required information is about a Channel Quality Information (CQI) transmission scheme, transmission channel or HARQ configuration. The IDM is transmitted on a Forward Access Channel (FACH) rather than the SCH. The FACH serving as a downlink channel to be transmitted up to a cell boundary is not applied to the HARQ or AMC, which is different from the SCH. In step 330, the UE 305 receives the IDM, detects the short ID, and transmits and receives data on the SCH.

Accordingly, there is a need for an improved method and apparatus in which a UE initiates communications on a shared channel to initiate a data transmission and reception on the shared channel.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for initiating a data transmission and reception on a shared channel.

In accordance with an aspect of exemplary embodiments of the present invention, there is provided a method for initiating communications on a shared channel in a mobile communication system, in which an uplink signal for requesting communications is transmitted on the shared channel to a Node B; a delay duration without monitoring a downlink is provided after transmitting the uplink signal; the downlink is monitored during a valid period after the delay duration has elapsed and whether a downlink signal responding to the uplink signal is received in one transmission time interval within the valid period is determined; and data on the shared channel is transmitted and received when the downlink signal is received in the valid period.

In accordance with another aspect of exemplary embodiments of the present invention, there is provided a user equipment for initiating communications on a shared channel in a mobile communication system, in which an uplink signal generator generates an uplink signal for requesting communications on the shared channel and transmits the generated uplink signal to a Node B. A downlink signal processor waits for a delay duration without monitoring a downlink after transmitting the uplink signal, monitors the downlink during a valid period after the delay duration has elapsed and determines whether a downlink signal responding to the uplink signal is received in one transmission time interval within the valid period. A shared channel processor transmits and receives data on the shared channel when the downlink signal is received in the valid period.

In accordance with yet another aspect of exemplary embodiments of the present invention, there is provided a method for initiating communications on a shared channel in a mobile communication system, in which an uplink signal for requesting communications on the shared channel is received from a user equipment. After waiting for a delay duration after receiving the uplink signal, a downlink signal is transmitted in one transmission time interval within a valid period in response to the uplink signal. Data on the shared channel is transmitted and received after transmitting the downlink signal.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The subject matter of exemplary embodiments of the present invention is to transmit a data packet on a Shared Channel (SCH) in a mobile communication system. A User Equipment (UE) transmits a signal including a message for requesting use of the SCH to a Node B. When a response to the signal is received, the SCH operates. A process for establishing and employing the SCH between the UE and the Node B is referred to as the SCH initiation.

Next, exemplary embodiments of the present invention will be described with reference to a Third-Generation Partnership Project (3GPP) Long Term Evolution (LTE) system using Orthogonal Frequency Division Multiplexing (OFDM) based on a Universal Mobile Telecommunication Service (UMTS) system. Those skilled in the art will appreciate that the use of the SCH can be modified in other mobile communication systems having a technical background and a channel form analogous to those described in the context of exemplary embodiments of the present invention without departing from the scope of the present invention.

Figure 1:
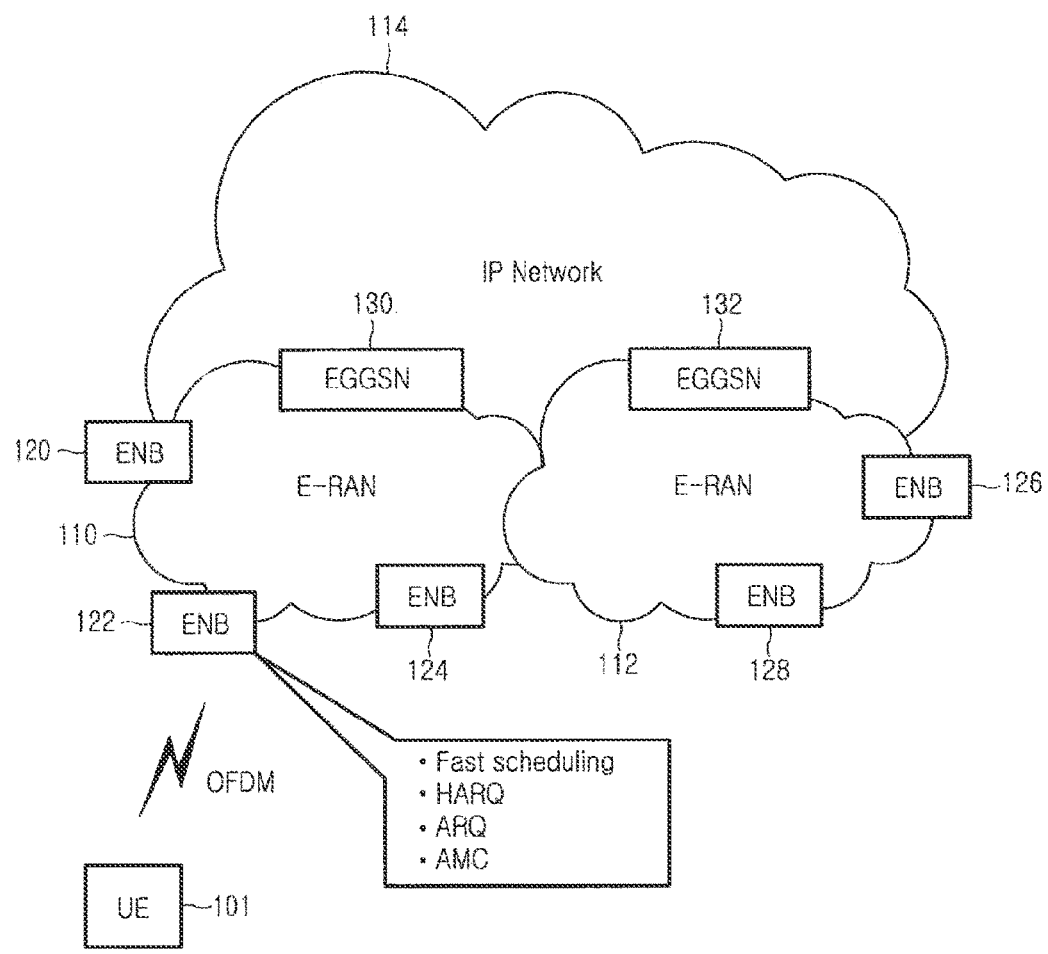
FIG. 1 illustrates an example of a structure of an evolved mobile communication system.
Figure 2:
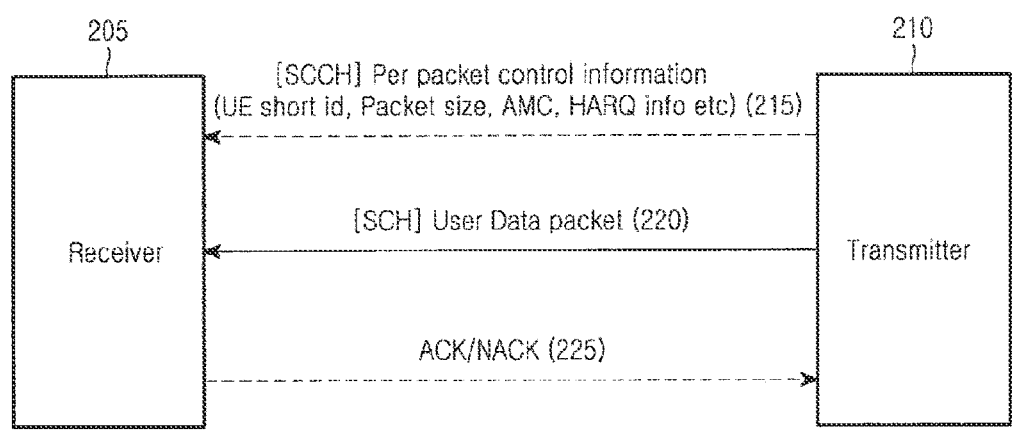
FIG. 2 schematically illustrates a data transmission and reception on a Shared Channel (SCH)
Figure 3:
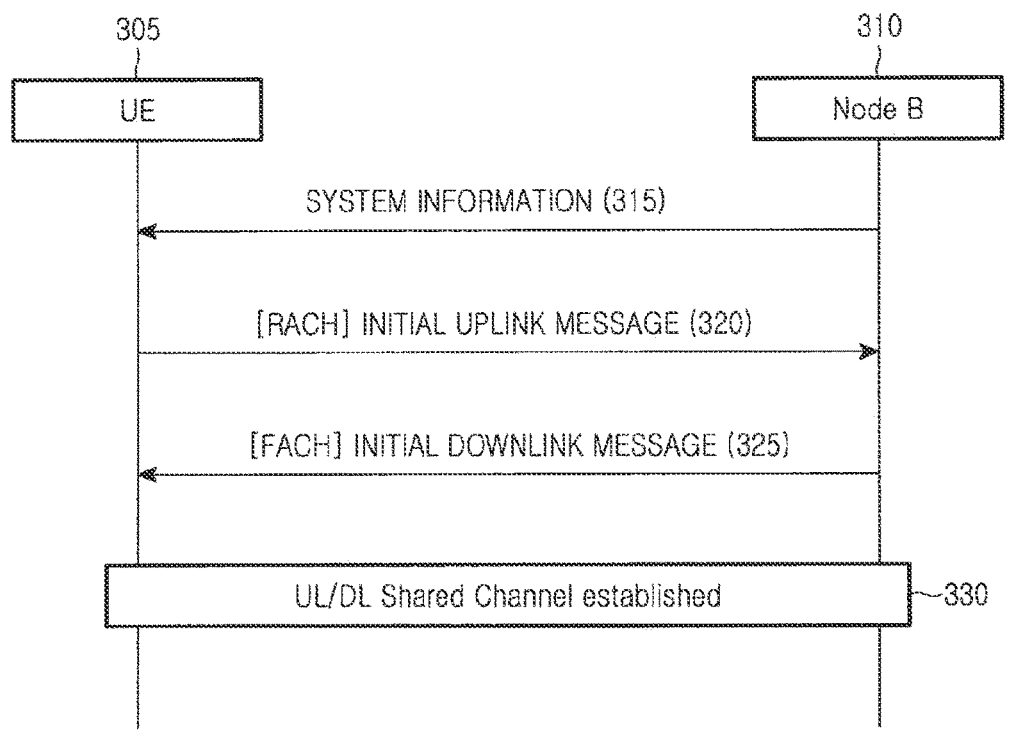
FIG. 3 is a message flow diagram illustrating a conventional operation for acquiring a short Identifier (ID) after a User Equipment (UE) moves to a new cell.
Figure 4:
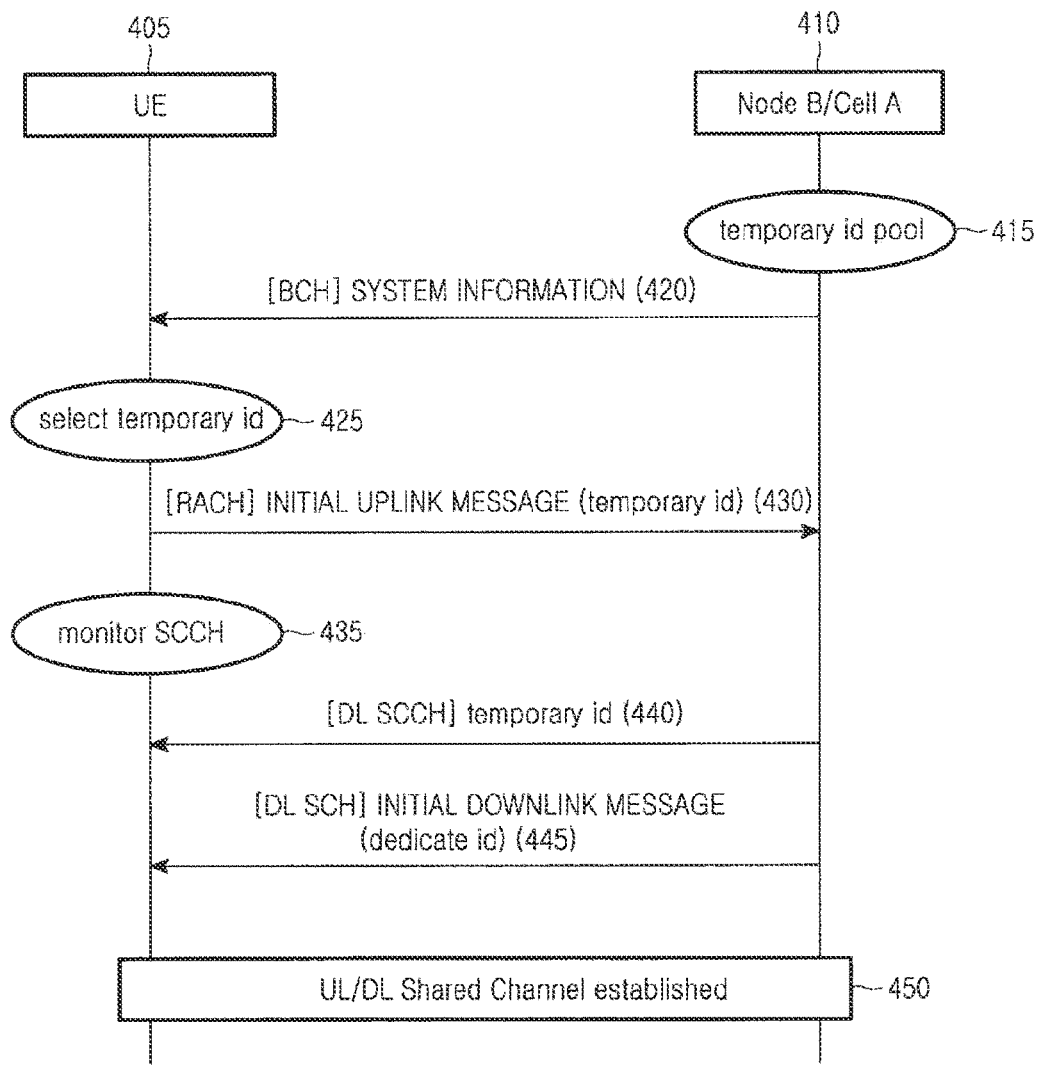
FIG. 4 is a message flow diagram illustrating an operation for acquiring a short ID from a SCH after a UE moves to a new cell in accordance with an exemplary embodiment of the present invention.

FIG. 4 is a message flow diagram illustrating an operation for acquiring a short Identifier (ID) from a SCH after a UE moves to a new cell in accordance with an exemplary embodiment of the present invention. Herein, a Node B 410 covers a cell A, and a UE 405 is powered on in the cell A or moves from a different cell to the cell A.

Referring to FIG. 4, the Node B 410 manages cell-by-cell temporary ID pools in step 415. The temporary ID pools may be some of all assignable short IDs and may be the same or different between cells. When a size of each short ID is, for example, 10 bits, 1024 Short IDs 0~1023 can be provided. Some of these short IDs can be set to temporary IDs on a cell-by-cell basis. However, the same short ID pool can be managed for all the cells. For example, a temporary ID pool of the cell A has Short IDs 0~23.

In step 420, the UE 405 acquires system information from a Broadcasting Channel (BCH) of the Node B 410. The system information includes the temporary ID pool of the cell A. The UE 405 stores the temporary ID pool. In the above example, the UE 405 detects that the temporary ID pool of the cell A is constructed with twenty-four (24) short IDs including Short IDs zero (0) to twenty-three (23).

In step 425, the UE 405 randomly selects one of the short IDs belonging to the temporary ID pool before transmitting an Initial Uplink Message (IUM) on a Random Access Channel (RACH). In step 430, the UE 405 transmits the IUM on the RACH. The IUM is used to request use of the SCH while notifying a network of the presence of the UE 405. The IUM can include a unique ID and capability information of the UE 405 and the selected temporary ID. In step 435, the UE 405 monitors a Downlink SCCH (DL SCCH) after transmitting the IUM and determines whether a message mapped to the IUM, that is, a message having the selected temporary ID, is received.

In step 445, the Node B 410 sets a dedicated short ID to be allocated to the UE 405 in response to the received IUM, includes the dedicated short ID in an Initial Downlink Message (IDM), and transmits the IDM with the dedicated short ID to the UE 405 through the SCH. In addition, information required to use the SCH in the UE 405 is contained in the IDM. For example, the required information corresponds to a Channel Quality Information (CQI) transmission scheme, a transmission channel, or Hybrid Automatic Retransmission Request (HARQ) configuration. When the IDM is transmitted on the SCH, the Node B 410 transmits per packet control information including the selected temporary ID on the SCCH such that the UE 405 can receive the IDM in step 440. Herein, the per packet control information includes reception parameters required to demodulate and decode a downlink packet in the UE 405, for example, information corresponding to a UE ID, a packet size, a modulation scheme, a HARQ, and the like. In step 450, the UE 405 receives the IDM by referring to the per packet control information, determines that the initiation for data transmission and/or reception has been completed by detecting a dedicated short ID contained in the IDM, and starts to transmit and receive data on the SCH using the dedicated short ID.

In the exemplary embodiment of the present invention as described above, the temporary ID is used to receive the IDM for allocating the dedicated short ID on the SCH. However, when at least two UEs within one cell select the same temporary ID, the Node B cannot identify the UEs using temporary IDs. This is referred to as a collision of temporary IDs.

Figure 5:
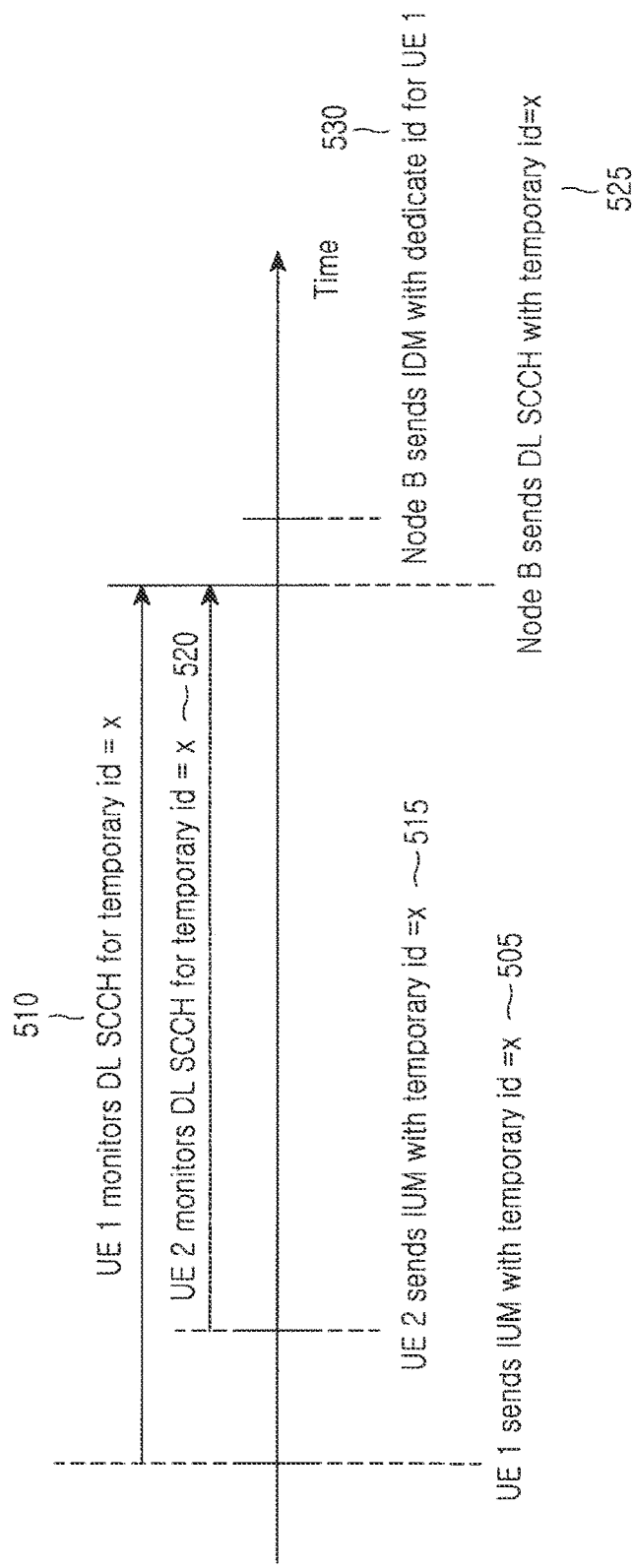
FIG. 5 illustrates a situation in which a collision of temporary IDs occurs.

FIG. 5 illustrates a situation in which the collision of temporary IDs occurs. Referring to FIG. 5, a UE 1 selects a temporary ID x and sends a first IUM at a time 505 and a UE 2 selects the same temporary ID x and sends a second IUM at a time 515. After sending the first IUM, the UE 1 monitors a SCCH during a time 510. After sending the second IUM, the UE 2 monitors the SCCH during a time 520.

In response to the first IUM sent from the UE 1, a Node B sets a dedicated short ID y for the UE1 and then sends the SCCH with the temporary ID x at a time 525. Then, the Node B includes the dedicated short ID y in an IDM and sends the IDM with the dedicated short ID y to the UE 1 at a time 530. At this time, both the UE 1 and UE 2 wait for the temporary ID x to be sent on the SCCH and receive the IDM transmitted on the SCH. Thus, the UE 2 may make a wrong determination that the dedicated short ID has been allocated to the UE 2.

This problem occurs when multiple UEs select the same temporary ID during a relatively short time. To address the problem, a method for increasing a size of a temporary ID pool or decreasing a time in which an operation error occurs can be considered. However, the method for increasing the size of the temporary ID pool is not preferred because of a decrease in the number of dedicated short IDs. For this reason, the UE monitors the SCCH during a predefined valid period P after waiting for a predefined delay duration T without starting to monitor the SCCH immediately after a signal for requesting use of the SCH including a temporary ID is transmitted. A response signal transmitted by the Node B through the SCCH can be received in a transmission time interval within the valid period P. Thus, the time in which an operation error may occur is limited to within the valid period in which the SCCH is monitored. In an exemplary implementation, the valid period P is set which includes multiple transmission time intervals rather than one specific transmission time interval.

Figure 6:
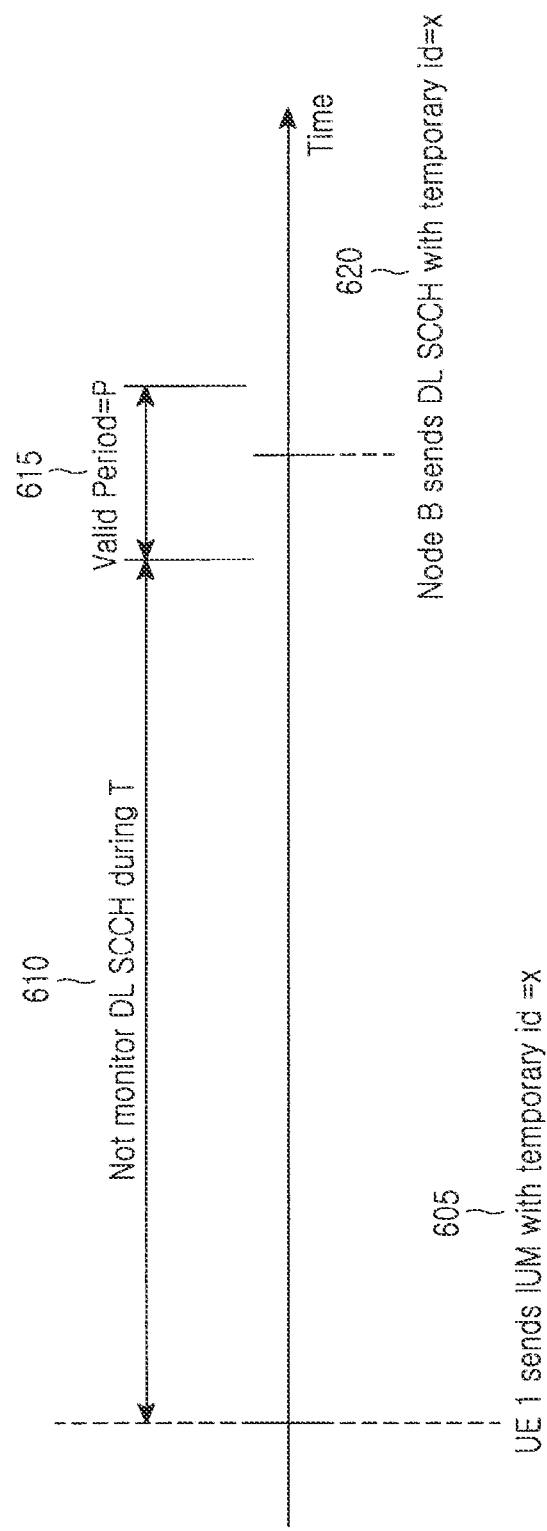
FIG. 6 illustrates an operation for preventing the collision of temporary IDs using a valid period.

FIG. 6 illustrates an operation for preventing the collision of temporary IDs in accordance with an exemplary embodiment of the present invention.

Referring to FIG. 6, a UE selects a temporary ID x, includes the temporary ID x in an IUM, and provides a Node B with the IUM as a signal for requesting use of an SCH at a time 605. After sending the IUM, the UE waits for a delay duration 610 of T without monitoring a SCCH. After the delay duration 610 ends, the UE monitors a response signal sent from the Node B through the SCCH during a valid period 615 of P. When the temporary ID x is detected in the valid period 615, the UE tries to receive an IDM on the SCH. On the other hand, when the temporary ID x is not detected in the P period 615, the UE determines that the SCH initiation has failed.

The Node B sends the SCCH with a temporary ID at a time 620 of one transmission time interval in a period of [T, T+P] after receiving the IUM. Then, the Node B sends an IDM with a dedicated short ID to the UE.

In an exemplary implementation, the delay duration T causing delay is small. However, when the delay duration T is set to an excessively small value, processing capability is degraded in the Node B. Thus, the Node B cannot prepare per packet control information with a temporary ID before the valid period P is reached. Therefore, T and P closely related to the processing capability of the Node B can have different values on a cell-by-cell basis. The T and P values are included in system information to be transmitted on the cell-by-cell basis and are provided to UEs.

Figure 7:
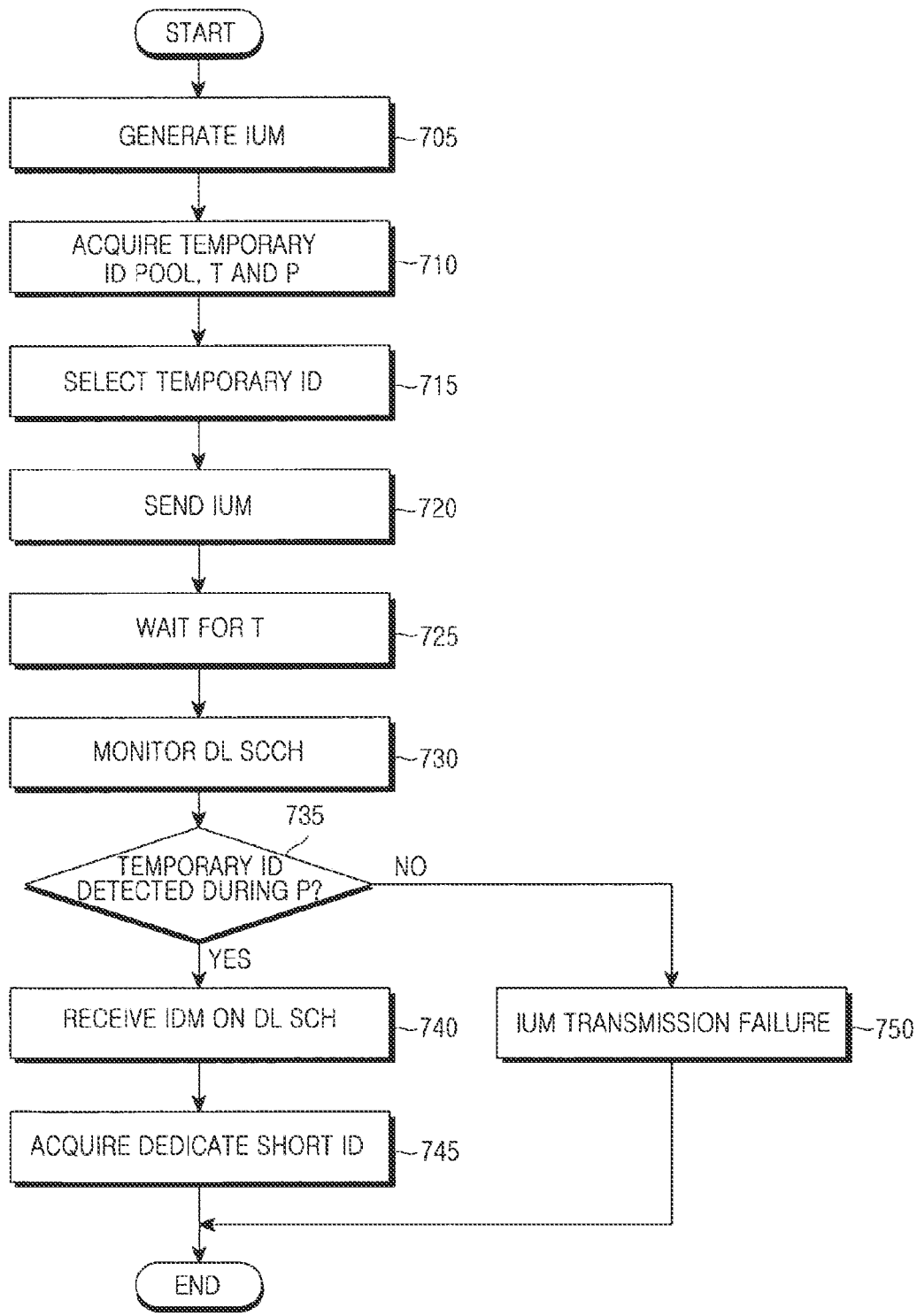
FIG. 7 is a flowchart illustrating an operation of the UE in accordance with an exemplary embodiment of the present invention.

FIG. 7 is a flowchart illustrating an operation of the UE in accordance with an exemplary embodiment of the present invention.

Referring to FIG. 7, the UE generates an IUM for initiating communications on a SCH in a current cell in step 705 and acquires a temporary ID pool of the current cell and T and P values in step 710. The UE acquires the temporary ID pool and the T and P values from system information broadcast from a Node B of the current cell. If the IUM is generated, it means that a short ID to be used in the current cell is not acquired as the UE is powered on or newly moves to the current cell. If the temporary ID pool is acquired, it means that the UE detects temporary IDs available in the current cell.

In step 715, the UE selects one temporary ID from the temporary ID pool. At this time, all temporary IDs can be selected in the same probability. In step 720, the UE sends the IUM with the selected temporary ID to the Node B. In step 725, the UE waits for the delay duration T without monitoring a DL SCCH after sending the IUM. When the delay duration T has elapsed, the UE monitors the SCCH during the valid period P in step 730. The UE determines whether per packet control information with the selected temporary ID is received on the SCCH in step 735. If the selected temporary ID is detected from the SCCH in the valid period P, the UE proceeds to step 740. Otherwise, the UE proceeds to step 750.

In step 740, the UE receives an IDM on the SCH by referring to the per packet control information. In step 745, the UE sets a short ID included in the IDM to its own dedicated short ID and then transmits and receives data on the SCH using the short ID. On the other hand, the UE determines that the initiation for communications on the SCH has failed and then performs a required subsequent operation in step 750. For example, the UE retransmits the IUM.

Figure 8:
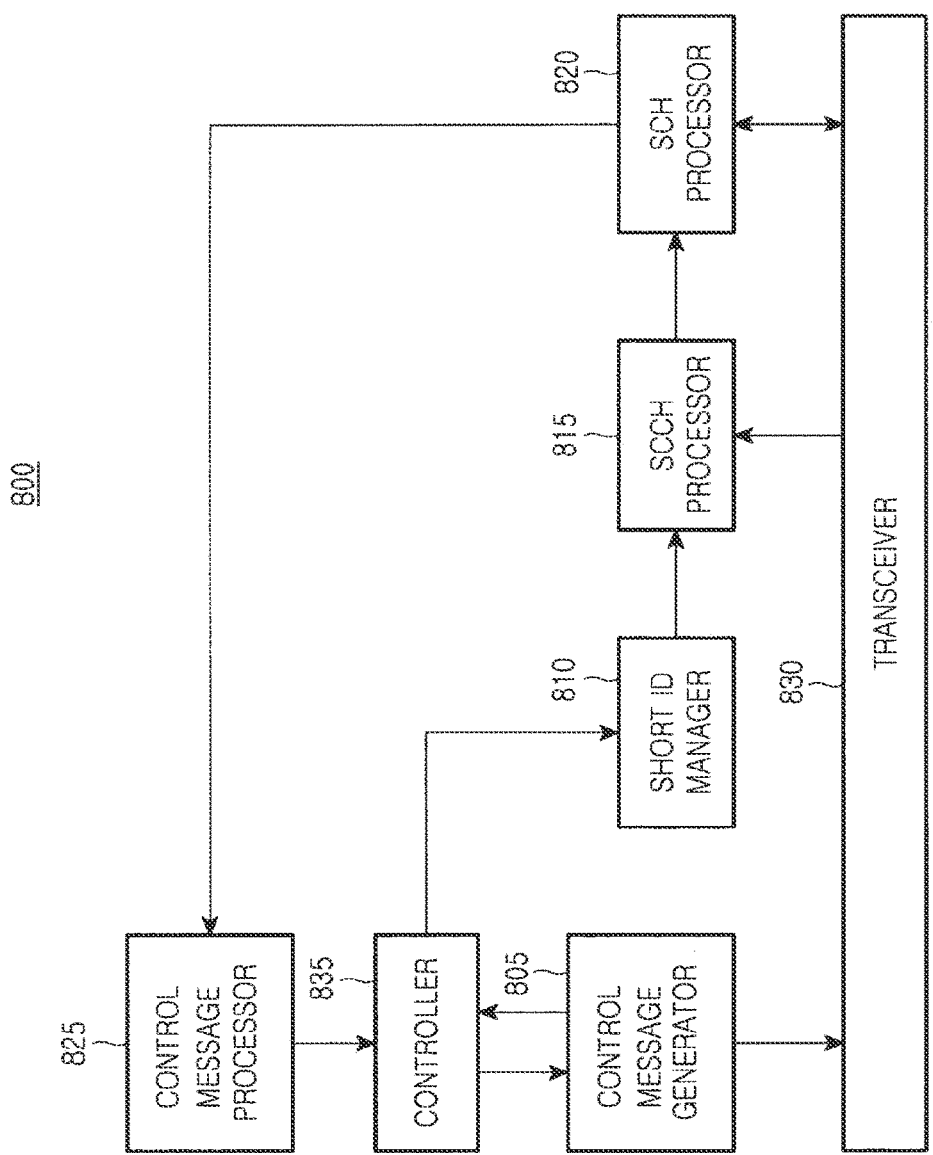
FIG. 8 is a block diagram illustrating a structure of the UE in accordance with an exemplary embodiment of the present invention.

FIG. 8 is a block diagram illustrating a structure of the UE in accordance with an exemplary embodiment of the present invention. As illustrated in FIG. 8, the UE is provided with a control message generator 805, a control message processor 825, a controller 835, a short ID manager 810, a SCCH processor 815, a SCH processor 820, and a transceiver 830.

Referring to FIG. 8, the controller 835 controls an operation of the UE related to radio resources. For example, the controller 835 performs an operation for establishing or releasing a radio channel or an operation for setting information to be inserted into an uplink control message. The controller 835 delivers the information to be inserted into an IUM to the control message generator 805. The controller 835, for example, manages a temporary ID pool and T and P values acquired from system information of a current cell, selects a temporary ID from the temporary ID pool, and delivers the selected temporary ID to the control message generator 805.

The control message generator 805 generates the uplink control message using the information received from the controller 835. For example, the control message generator 805 generates the IUM using information such as the temporary ID and the like delivered from the controller 835 and delivers the generated IUM to the transceiver 830. The transceiver 830 transmits a message or data to and receives a message or data from a UE through a radio channel.

When the controller 835 is notified that the IUM has been transmitted from the control message generator 805, the controller 835 waits for the delay duration T and delivers the selected temporary ID and the P value to the short ID manager 810. The short ID manager 810 is responsible for activating or deactivating a short ID, and activates a short ID received from the controller 835 during the valid period P in response to a command of the controller 835. If the short ID is activated, it means that a control operation is performed such that the SCCH processor 815 detects a message with the activated short ID from per packet control information received on the SCCH. When the controller 835 provides the temporary ID, the short ID manager 810 controls the SCCH processor 815 to detect a message with the temporary ID.

When detecting per packet control information with a short ID activated by the short ID manager 810, particularly the temporary ID, from the SCCH, the SCCH processor 815 delivers the per packet control information to the SCH processor 820. When receiving the per packet control information from the SCCH processor 815, the SCH processor 820 detects a packet from the SCH, processes (or demodulates/decodes) the detected packet using the per packet control information, and delivers a successfully processed packet to a suitable device. When the packet is an IDM transmitted on the SCH, the IDM is delivered to the control message processor 825. Otherwise, the packet is delivered to an associated application section.

The control message processor 825 delivers control information contained in the IDM to the controller 835. The controller 835 provides the short ID manager 810 with a dedicated short ID of the information delivered from the control message processor 825. At this time, an activation period of the dedicated short ID is continuously maintained until a special command is issued. The short ID manager 810 controls the SCCH processor 815 to detect per packet control information with the dedicated short ID during the activation period of the dedicated short ID. Thus, the dedicated short ID is applied for transmission and reception of data on the SCH.

Figure 9:
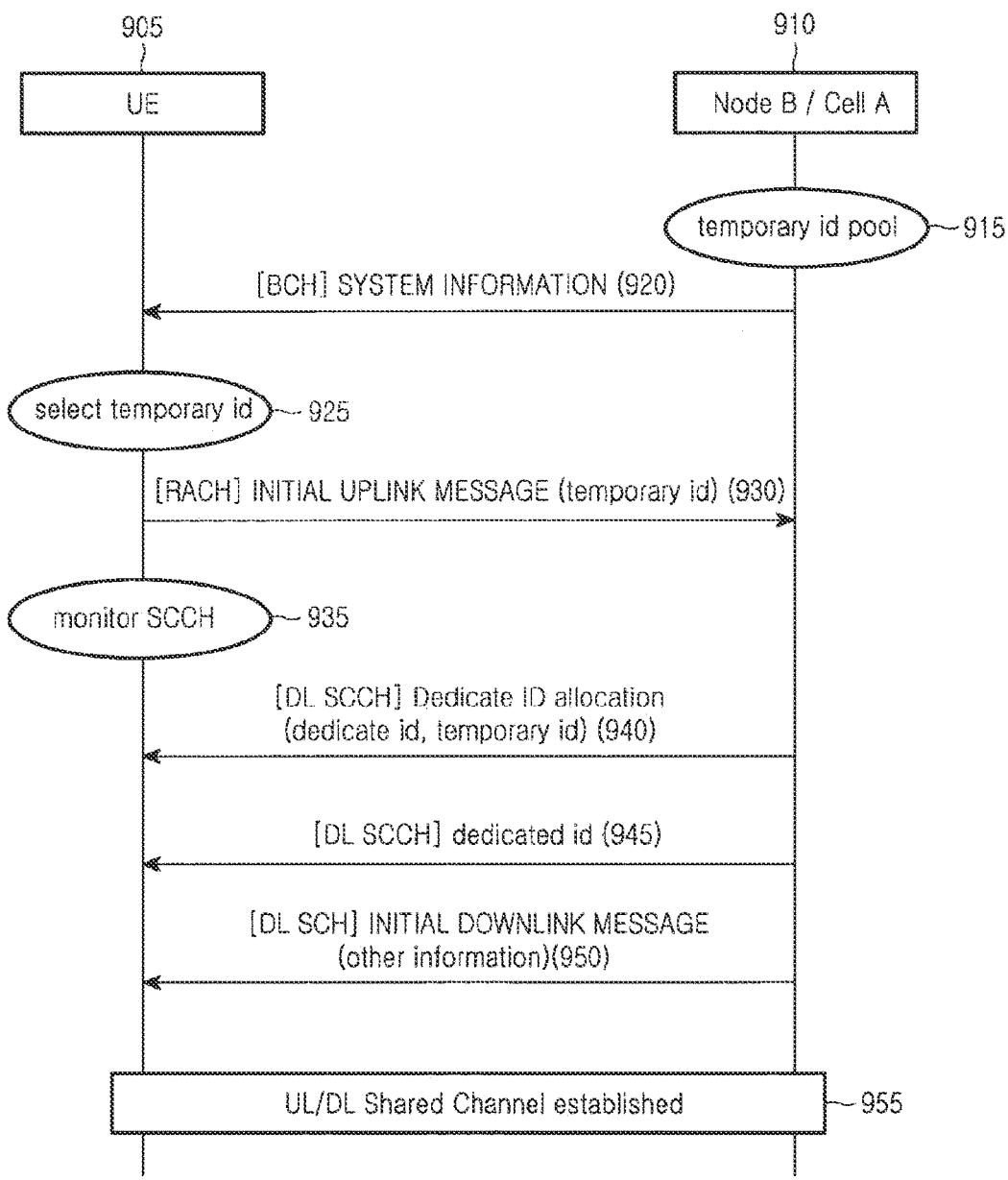
FIG. 9 is a flowchart illustrating an operation for acquiring a short ID from a Shared Control Channel (SCCH) in accordance with an exemplary embodiment of the present invention.

In an exemplary embodiment of the present invention, a dedicated short ID is transmitted on the SCCH. FIG. 9 is a flowchart illustrating an operation for acquiring a short ID from the SCCH in accordance with an exemplary embodiment of the present invention. Herein, a Node B 910 covers a cell A and a UE 905 is powered on in the cell A or moves from a different cell to the cell A.

Referring to FIG. 9, the Node B 910 manages temporary ID pools on a cell-by-cell basis in step 915. Because a temporary ID is distinguished from a general short ID in an exemplary embodiment, the cell-by-cell temporary ID pools do not need to be differently applied. The same temporary ID pool can be applied to all the cells.

In step 920, the UE 905 acquires system information from a BCH of the Node B 910. The system information includes a temporary ID pool of the cell A, a delay duration T, and a valid period P. In step 925, the UE 905 randomly selects one of temporary IDs belonging to the temporary ID pool before transmitting an IUM on a RACH. In step 930, the UE 905 sends the IUM on the RACH. In general, the IUM is used to request use of the SCH while notifying a network of the presence of the UE 905. The IUM can include a unique ID and capability information of the UE 905 and the selected temporary ID. In step 935, the UE 905 monitors a DL SCCH after sending the IUM and determines whether a message mapped to the IUM, that is, a message with the selected temporary ID, is received.

In step 940, the Node B 910 sets a dedicated short ID to be allocated to the UE 905 in response to the received IUM and sends a dedicated short ID allocation message with the dedicated short ID and the temporary ID contained in the IUM using the SCCH. When detecting the temporary ID contained in the dedicated short ID allocation message, the UE can use the dedicated short ID contained in the dedicated short ID allocation message to transmit and receive data on the SCH.

In step 945, the Node B 910 transmits per packet control information with the dedicated short ID on the SCCH in a normal DL SCH transmission process for sending an IDM. In step 950, the Node B 910 transmits the IDM on the SCH. In step 955, the UE 905 receives the IDM and transmits and receives data on the SCH using the dedicated short ID.

Figure 10A:
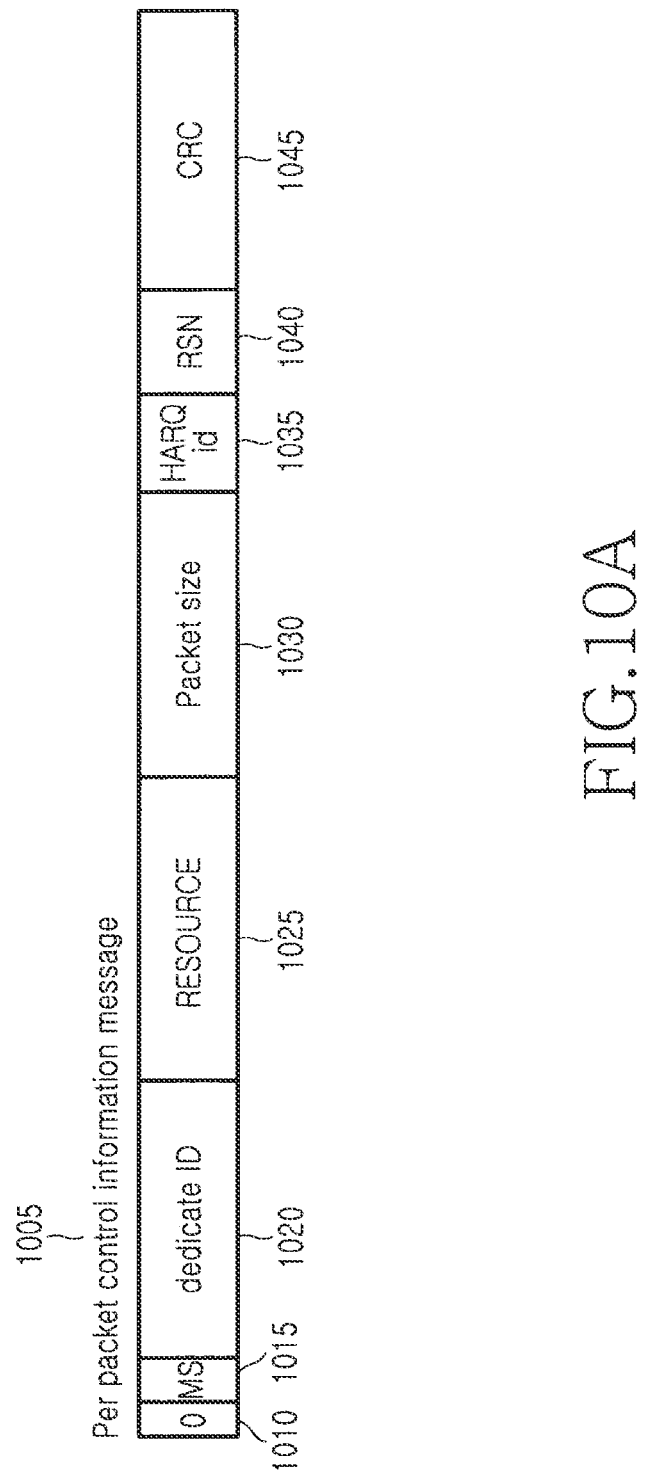
FIGS. 10A and 10B illustrate structures of a per packet control information message and a dedicated short ID allocation message in accordance with an exemplary embodiment of the present invention.
Figure 10B:
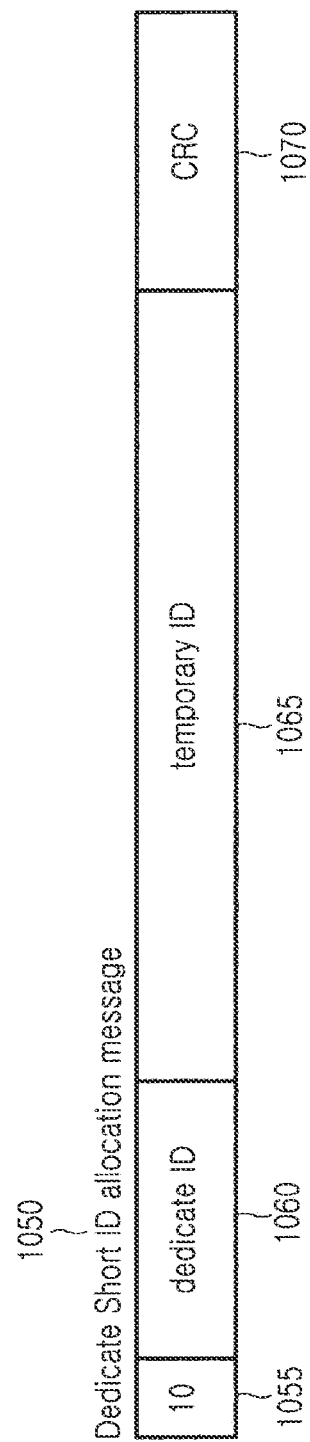

As described above, different messages for transmitting the per packet control information and allocating the dedicated short ID through the SCCH are provided. The different messages are distinguished by message types. FIGS. 10A and 10B illustrate structures of a per packet control information message and a dedicated short ID allocation message in accordance with an exemplary embodiment of the present invention.

Referring to FIG. 10A, a per packet control information message 1005 contains per packet control information about a packet to be transmitted on a SCH. The per packet control information includes, for example, a Modulation Scheme (MS) field 1015 for indicating an MS applied to the packet, a dedicate short ID 1020 for identifying a UE for receiving the packet, a resource field 1025 for indicating a radio channel on which the packet is transmitted (that is, a timeslot of an allocated subcarrier), a size field 1030 for indicating a size of the packet, a HARQ ID 1035 for identifying a HARQ processor of the packet, a Retransmission Serial Number (RSN) 1040, a Cyclic Redundancy Check code (CRC) field 1045, and the like.

A first bit 1010 of the per packet control information message 1005 is allocated to distinguish the per packet control information message 1005 from the dedicated short ID allocation message 1050. That is, if the first bit is 0, it means that the message is the per packet control information message 1005.

The dedicated short ID allocation message 1050 is provided with a dedicated short ID 1060, a temporary ID 1065, and a CRC field 1070. A dedicated short ID to be allocated to a UE is inserted into the dedicated short ID field 1060. A temporary ID reported from the UE is inserted into the temporary ID field 1065. A CRC operation result for a message transmitted on the SCCH is inserted into the CRC field 1070.

Because a modulation scheme for a packet does not need to be indicated in the dedicated short ID allocation message 1050, first two bits 1055 of the dedicated short ID allocation message 1050 are allocated to distinguish the dedicated short ID allocation message 1050 from the per packet control information message 1005. That is, if the first two bits 1055 are 10, it means that the message is the dedicated short ID allocation message 1050.

Figure 11:
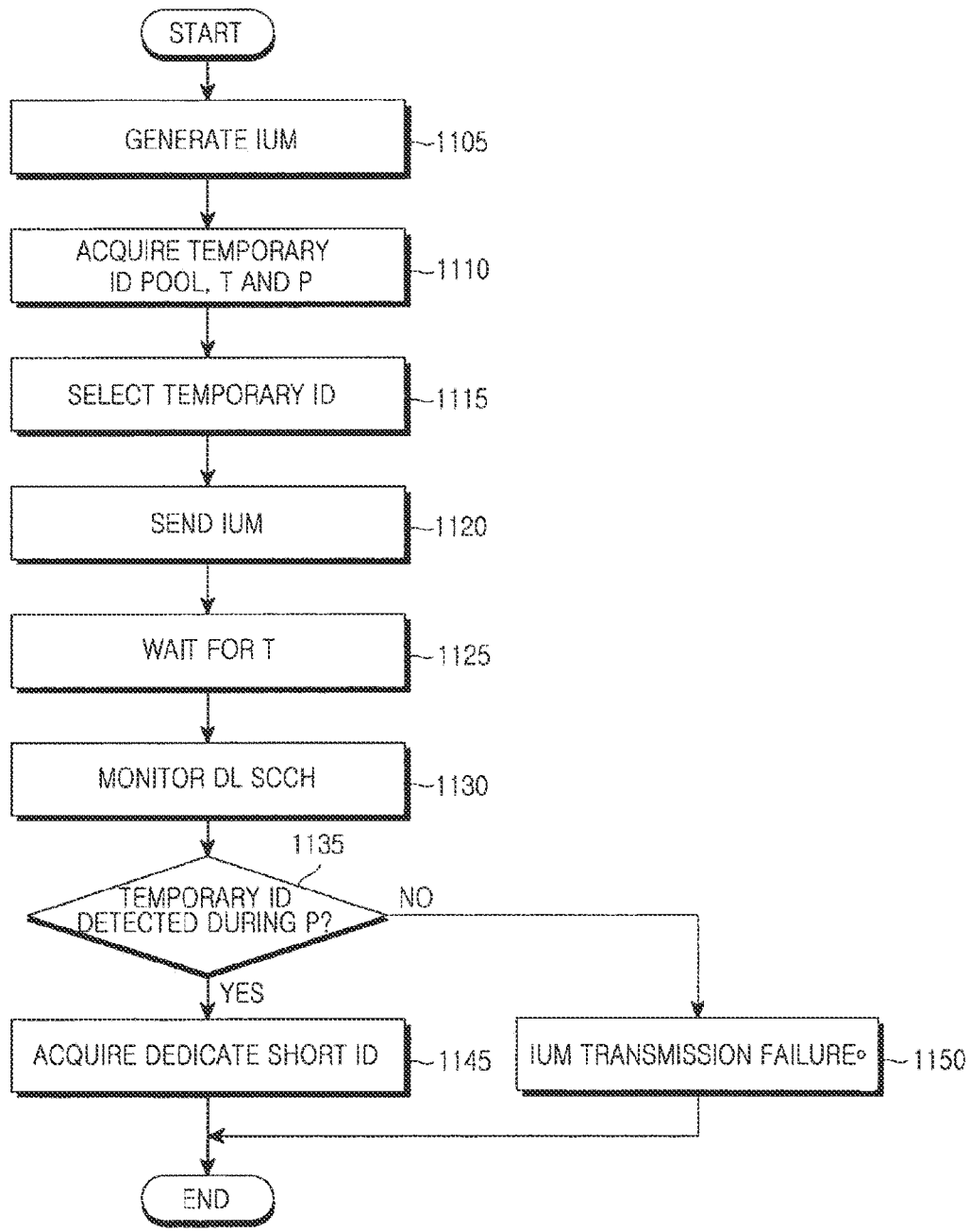
FIG. 11 is a flowchart illustrating an operation of the UE in accordance with an exemplary embodiment of the present invention.

FIG. 11 is a flowchart illustrating an operation of the UE in accordance with an exemplary embodiment of the present invention.

Referring to FIG. 11, the UE generates an IUM for initiating communications on a SCH in a current cell in step 1105 and acquires a temporary ID pool of the current cell and T and P values in step 1110. The UE acquires the temporary ID pool and the T and P values from system information broadcast from a Node B of the current cell. If the IUM is generated, it means that a short ID to be used in the current cell is not acquired as the UE is powered on or newly moves to the current cell. If the temporary ID pool is acquired, it means that the UE detects temporary IDs available in the current cell.

In step 1115, the UE selects one temporary ID from the temporary ID pool. In step 1120, the UE sends the IUM with the selected temporary ID to the Node B. In step 1125, the UE waits for the delay duration T without monitoring a DL SCCH after sending the IUM. When the delay duration T has elapsed, the UE monitors the SCCH during the valid period P in step 1130. The UE determines whether a dedicated short ID allocation message with the selected temporary ID is received on the SCCH in step 1135. If the dedicated short ID allocation message with the selected temporary ID is received in the valid period P, the UE proceeds to step 1145. Otherwise, the UE proceeds to step 1150.

In step 1145, the UE sets a short ID included in the dedicated short ID allocation message to its own dedicated short ID and then transmits and receives data on the SCH using the dedicated short ID. On the other hand, the UE determines that the initiation for communications on the SCH has failed and then performs a required subsequent operation in step 1150. For example, the UE retransmits the IUM.

Figure 12:
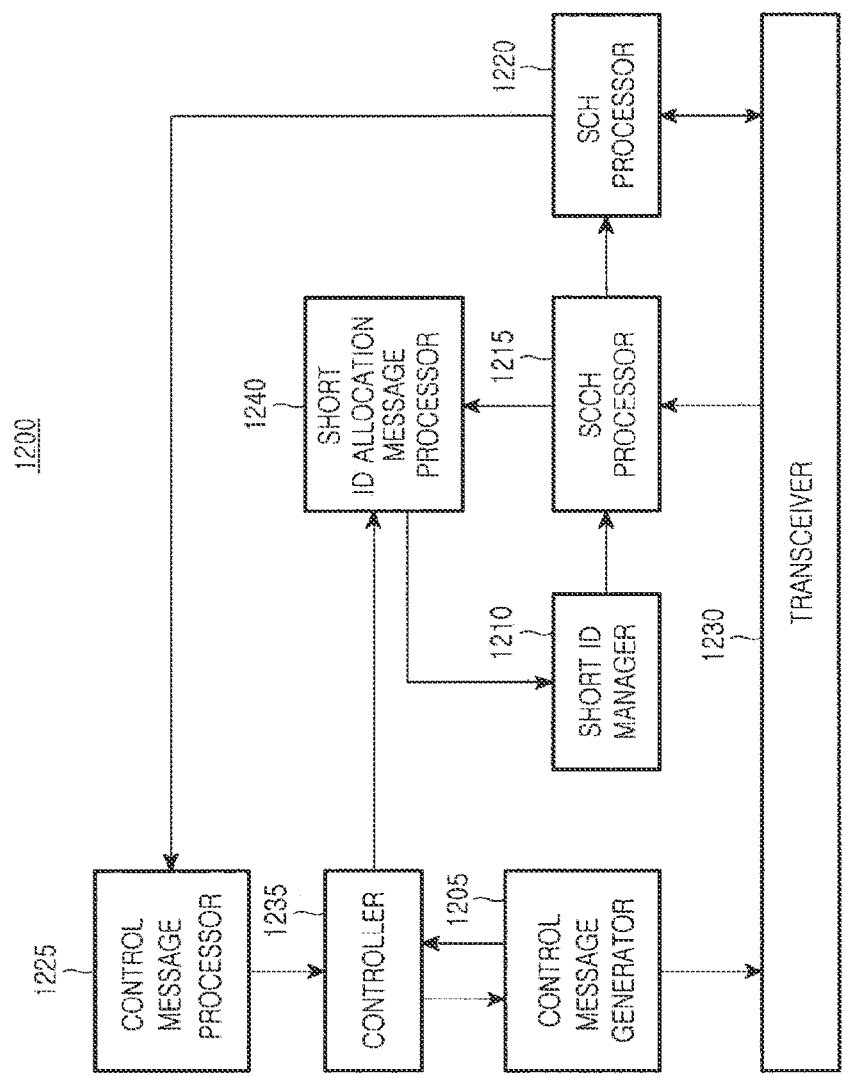
FIG. 12 is a block diagram illustrating a structure of the UE in accordance with an exemplary embodiment of the present invention.

FIG. 12 is a block diagram illustrating a structure of the UE in accordance with an exemplary embodiment of the present invention.

As illustrated in FIG. 12, the UE is provided with a control message generator 1205, a control message processor 1225, a controller 1235, a short ID manager 1210, a SCCH processor 1215, a SCH processor 1220, a dedicated short ID allocation message processor 1240, and a transceiver 1230.

Referring to FIG. 12, the controller 1235 controls an operation of the UE related to radio resources. For example, the controller 1235 performs an operation for establishing or releasing a radio channel or an operation for setting information to be inserted into an uplink control message. The controller 1235 delivers the information to be inserted into an IUM to the control message generator 1205. For example, the controller 1235 manages a temporary ID pool and T and P values acquired from system information of a current cell, selects a temporary ID from the temporary ID pool, and delivers the selected temporary ID to the control message generator 1205.

The control message generator 1205 generates the uplink control message using the information received from the controller 1235. In particular, the control message generator 1205 generates the IUM using information such as the temporary ID and the like delivered from the controller 1235 and delivers the generated IUM to the transceiver 1230. The transceiver 1230 transmits a message or data to and receives a message or data from a UE through a radio channel.

When the controller 1235 is notified that the IUM has been transmitted from the control message generator 1205, the controller 1235 waits for the delay duration T and delivers the selected temporary ID and the P value to the dedicated short ID allocation message processor 1240. The controller 1235 controls the dedicated short ID allocation message processor 1240 to monitor messages received on the SCCH during the valid period P. The SCCH processor 1215 detects a dedicated short ID allocation message among messages of the SCCH received from the transceiver 1230 and then delivers the detected dedicated short ID allocation message to the dedicated short ID allocation message processor 1240.

The dedicated short ID allocation message processor 1240 compares a temporary ID contained in the dedicated short ID allocation message received from the SCCH processor 1215 with the temporary ID received from the controller 1235. If the two temporary IDs are same as each other, the dedicated short ID allocation message processor 1240 delivers a dedicated short ID to the short ID manager 1210.

The short ID manager 1210 activates the short ID received from the dedicated short ID allocation message processor 1240. Then, the SCCH processor 1215 detects per packet control information contained in a message with the activated short ID among messages received on the SCCH and then delivers the detected per packet control information to the SCH processor 1220. When receiving the per packet control information from the SCCH processor 1215, the SCH processor 1220 detects a packet from the SCH, processes (or demodulates/decodes) the detected packet using the per packet control information, and delivers a successfully processed packet to a suitable device. When the packet includes an IDM transmitted on the SCH, the IDM is delivered to the control message processor 1225. Otherwise, the packet is delivered to an associated application section.

The control message processor 1225 delivers control information contained in the IDM to the controller 1235. The controller 1235 provides the short ID manager 1210 with a dedicated short ID of the information delivered from the control message processor 1225. At this time, an activation period of the dedicated short ID is continuously maintained until a special command is issued. The short ID manager 1210 controls the SCCH processor 1215 to detect per packet control information with the dedicated short ID during the activation period of the dedicated short ID. Thus, the dedicated short ID is applied for transmission and reception of data on the SCH.

As is apparent from the above description, the exemplary embodiments of present invention can reduce initiation delay and complexity of a system and a UE by efficiently initiating communications in a mobile communication system for transmitting data and messages on a SCH.

While the present invention have been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing random access in a user equipment (UE), the method comprising:
   receiving system information indicating a group of identifiers (IDs) and information indicative of a time period for receiving a downlink signal on a downlink channel in response to a first uplink signal;
   identifying a first ID from among the group of the IDs;
   transmitting the first uplink signal corresponding to the selected first ID for random access to a base station;
   checking the downlink channel during the time period, the time period beginning after a predetermined time duration from the transmitting of the first uplink signal;
   determining whether the downlink signal in response to the first uplink signal is received on the downlink channel in the time period, the downlink signal comprising a second ID and a third ID; and
   transmitting a second uplink signal including the third ID, in response to the downlink signal being received in the time period and the second ID is equal to the first ID.

2. The method of claim 1, wherein the third ID is an UE-ID.

3. The method of claim 1, wherein the second ID is one a plurality of IDs in an ID pool of a current cell.

4. A user equipment (UE) for performing random access, the UE comprising:
   a receiver configured to receive system information indicating a group of identifiers (IDs) and information indicative of a time period for receiving a downlink signal on a downlink channel in response to a first uplink signal;
   a controller configured to:
     identify a first ID from among the group of the IDs, and generate the first uplink signal corresponding to the selected first ID for random access;
     check the downlink channel during the time period, the time period beginning after a predetermined time duration from the transmitting of the first uplink signal, and
     determine whether the downlink signal in response to the first uplink signal is received on the downlink channel in the time period, the downlink signal comprising a second ID and a third ID; and
   a transmitter configured to:
     transmit the generated first uplink signal to a base station, and
     transmit a second uplink signal including the third ID, in response to the downlink signal being received in the time period and the second ID is equal to the first ID.

5. The UE of claim 4, wherein the third ID is an UE-ID.

6. The UE of claim 4, wherein the second ID is one a plurality of IDs in an ID pool of a current cell.

7. A method for performing random access in a base station, the method comprising:
   transmitting system information indicating a group of identifiers (IDs) and information indicative of a time period for a user equipment (UE) to receive a downlink signal on a downlink channel in response to a first uplink signal;
   receiving the first uplink signal corresponding to a first ID selected from among the group of the IDs for random access from the UE;
   transmitting the downlink signal on the downlink channel in the time period in response to the first uplink signal, the downlink signal comprising a second ID and a third ID, the time period beginning after a predetermined time duration from the transmitting of the first uplink signal; and
   receiving a second uplink signal including the third ID, in response to the second ID being equal to the first ID.

8. The method of claim 7, wherein the third ID is an UE-ID.

9. The method of claim 7, wherein the second ID is one a plurality of IDs in an ID pool of a current cell.

10. A base station for performing random access, the base station comprising:
a transceiver configured to:
  transmit system information indicating a group of identifiers (IDs) and information indicative of a time period for a user equipment (UE) to receive a downlink signal on a downlink channel in response to a first uplink signal,
  receive the first uplink signal corresponding to a first ID selected from among the group of the IDs for random access from a user Equipment (UE),
  transmit the downlink signal on the downlink channel in the time period in response to the first uplink signal, the downlink signal comprising a second ID and a third ID, the time period beginning after a predetermined time duration from the transmitting of the first uplink signal, and
  receive a second uplink signal including the third ID, in response to the second ID being equal to the first ID; and
a controller configured to control the transceiver to transmit the downlink signal in the time period.

11. The base station of claim 10, wherein the third ID is an UE-ID.

12. The base station of claim 10, wherein the second ID is one a plurality of IDs in an ID pool of a current cell.

* * * * *